(12) United States Patent
Mikkonen

(10) Patent No.: US 6,885,633 B1
(45) Date of Patent: Apr. 26, 2005

(54) NETWORK NODE AND A SYSTEM

(75) Inventor: Olli Mikkonen, Atlanta, GA (US)

(73) Assignee: Stonesoft Oy, Espoo (FI)

( * ) Notice: Subject to any disclaimer, the term of this patent is extended or adjusted under 35 U.S.C. 154(b) by 0 days.

(21) Appl. No.: 09/546,459

(22) Filed: Apr. 10, 2000

(51) Int. Cl.$^7$ .............................................. G01R 31/08
(52) U.S. Cl. ...................... 370/217; 370/220; 370/225; 370/228
(58) Field of Search .............................. 370/351, 352, 370/401, 216, 217, 221, 225, 218, 219, 220, 227, 228, 241, 242, 244; 379/221.03; 340/825.01; 714/13, 3

(56) References Cited

U.S. PATENT DOCUMENTS

| | | | | |
|---|---|---|---|---|
| 5,016,244 A | * | 5/1991 | Massey, Jr. et al. | 370/16 |
| 5,649,091 A | * | 7/1997 | Ould-Ali et al. | 395/182.09 |
| 5,835,696 A | * | 11/1998 | Hess | 395/182.08 |
| 6,023,452 A | * | 2/2000 | Shiragaki | 370/227 |
| 6,108,300 A | * | 8/2000 | Coile et al. | 370/217 |
| 6,111,852 A | * | 8/2000 | Leung et al. | 370/217 |
| 6,208,616 B1 | * | 3/2001 | Mahalingam et al. | 370/216 |
| 6,285,656 B1 | * | 9/2001 | Chaganty et al. | 370/228 |
| 6,295,276 B1 | * | 9/2001 | Datta et al. | 370/218 |

* cited by examiner

Primary Examiner—Ajit Patel
Assistant Examiner—Steven Blount
(74) Attorney, Agent, or Firm—Ronald Craig Fish, a Law Corp.

(57) ABSTRACT

The invention is related to structures used for providing fault tolerance in computer data networks. According to the invention, fault tolerance is achieved by redundancy, i.e. by using at least two network nodes in parallel. The network nodes have at least two physical network interface to a network, only one of which is active during normal operation. In the case of two network nodes being used, both of these have two physical network interfaces to the same network. A first network interfaces on the first node has the same IP and MAC address as one interface on the second node, and the second network interface on the first node has the same IP and MAC address as the other interface on the second node. The IP and MAC addresses of the two interfaces of each node are different, whereby the two nodes provide a first IP address and a corresponding first MAC address, and a second IP address and a corresponding second MAC address. In normal operation, a first node of the two nodes handles traffic directed to the first IP address and ignores the traffic directed to the second IP address, and the second node handles traffic directed to the second IP address and ignores the traffic directed to the first IP address. The two nodes monitor each other for fault conditions, and if one of the nodes show signs of failure, the other node activates the other of its interfaces and starts handling traffic directed to both IP addresses.

12 Claims, 2 Drawing Sheets

NETWORK NODE AND A SYSTEM

BACKGROUND OF THE INVENTION

1. Field of the Invention

The invention is related to structures used for providing fault tolerance in computer data networks. Especially, the invention is related to such a network node as specified in the preamble of the independent claim directed to a network node.

2. Description of Related Art

Fault tolerance is an important feature in network nodes connecting networks to one another, such as a local area network of a company to the public Internet. Fault tolerance is typically achieved by arranging for other network nodes to take care of duties of a network node having a failure. This is typically realized by using more than one network node to take care of a certain task, dividing the load among the nodes, and arranging the load of a failed node to be divided among the working ones. Various ways for arranging the load of a failed node to be divided among the working nodes are known, For example, two RFC standards define such mechanisms for routers, namely RFC 2281 "Cisco Hot Standby Router Protocol" (HSRP) and RFC 2338 "Virtual Router Redundancy Protocol" (VRRP).

In the HSRP protocol a plurality of routers forming a HSRP group work in concert to present the illusion of a single virtual router to the hosts for which the routers provide service. One of these routers is known as the active router, and takes care of actual routing of the packets. If the active router fails, one of the other routers, i.e. one of the backup routers, assumes the packet forwarding duties of the active router. Each HSRP group has an IP address and a well known MAC address, which are used by hosts for transmission of data via the virtual router.

The VRRP protocol uses the concept of a virtual touter, whose address is used by hosts for transmitting datagrams. One of the routers running the VRRP protocol acts as the master for a virtual router, i.e. performs the duties of the virtual router. The VRRP protocol provides a mechanism for transferring the duties to another router in the case of failure of the master router. Each virtual router has an IP address and a MAC address, which are used by hosts for transmission of data via the virtual router.

Both of these protocols provide for redirection of IP traffic in case of device failures. However, they are complicated and generate some, signaling traffic overhead in the network for executing the protocol. If the local area network to which they are connected to is large, the actual routers running the protocols may be in different segments, which brings the additional problem of informing bridges joining different network segments that in which segment the device corresponding to the virtual MAC address currently resides.

SUMMARY OF THE INVENTION

An object of the invention is to realize a structure for a fault tolerant system, which avoids the problems of prior art. A further object of the invention is to realize a structure for a fault tolerant system which is simple in construction, and does not create traffic overhead in the network.

The objects are reached by using at least two physical network interfaces to a certain network segment in a network node, combining at least two such network nodes into a fault tolerant unit, and arranging the network nodes to use only one of the physical network interfaces for communication with during normal operation and to ignore any traffic arriving via the other network interface from said certain network segment, and during a fault in one of these network nodes, activate both physical network interfaces to said certain network segment in the other network node.

The network node according to the invention is characterized by that, which is specified in the characterizing part of the independent claim directed to a network node. The system according to the invention is characterized by that, which is specified in the characterizing part of the independent claim directed to a system. The dependent claims describe further advantageous embodiments of the invention.

According to the invention, fault tolerance is achieved by redundancy, i.e. by using at least two network nodes in parallel. The network nodes have at least two physical network interface to a network segment, only one of which is active during normal operation. In the case of two network nodes being used, both of these have two physical network interfaces to the same network. A first network interfaces on the first node has the same IP and MAC address as one interface on the second node, and the second network interface on the first node has the same IP and MAC address as the other interface on the second node. The IP and MAC addresses of the two interfaces of each node are different, whereby the two nodes provide a first IP address and a corresponding first MAC address, and a second IP address and a corresponding second MAC address. Since a network node such as a plain router or a firewall node is connected between two networks, a corresponding structure of physical interfaces is used on the other side of the node as well, bringing the total number of physical interfaces on a node to four. In normal operation, a first node of the two nodes handles traffic directed to the first IP address and ignores the traffic directed to the second IP address, and the second node handles traffic directed to the second IP address and ignores the traffic directed to the first IP address. The two nodes monitor each other for fault conditions, and if one of the nodes show signs of failure, the other node activates the other of its interfaces and starts handling traffic directed to both IP addresses. These two nodes form a fault tolerant unit, and more than one such units can be used in parallel for higher capacity.

In principle, it is possible to use more than two network nodes in a single fault tolerant unit, in which case the number of physical network interfaces of each node for connection to one network corresponds to the number of network nodes in the fault tolerant unit. However, two nodes typically provide enough redundancy, whereby the use of more than two nodes might not be necessary in many applications of the inventive structure.

BRIEF DESCRIPTION OF THE DRAWINGS

Various embodiments of the invention will be described in detail below, by way of example only, with reference to the accompanying drawings, of which

Same reference numerals are used for similar entities in the figures.

DETAILED DESCRIPTION OF THE PREFERRED EMBODIMENTS

Figure 1:
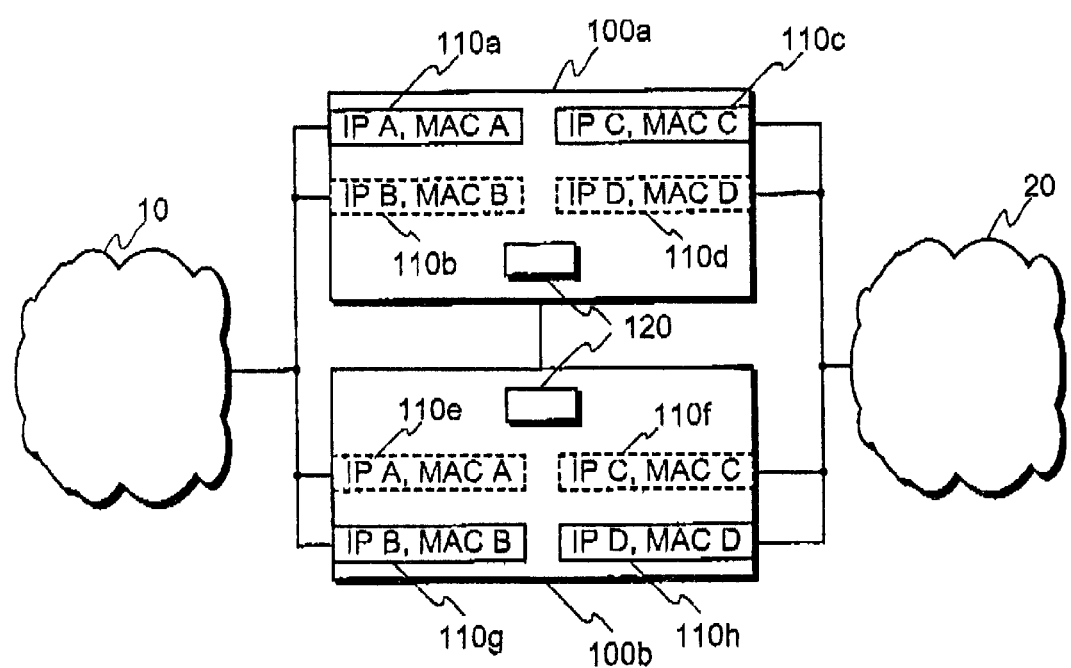
FIG. 1 shows a firewall unit according to an advantageous embodiment of the invention and FIG. 2 shows an example of a structure according to a further advantageous embodiment of the invention.

FIG. 1 shows a firewall unit 100a, 100b according to an advantageous embodiment of the invention. FIG. 1 shows a first network such as a local area network 10 and a second network such as the Internet 20. The firewall unit comprises two firewall nodes 100a, 100b. Each of the nodes comprises four physical network interfaces 110, such as network cards 110 in a computer 100 forming the network node. Two of the physical network interfaces on each node 100a, 100b are connected to the first network 10, and two to the second network 20.

In normal operation, node 100a forwards traffic arriving from network 10 to IP address IP A via network interfaces 110a and 110c to the second network 20, and traffic arriving from the second network 20 to IP address IP C via network interfaces 110c and 110a to the first network. In normal operation, node 100a ignores any traffic arriving to IP address IP B on the interface 110b and IP address IP D on interface 110d. Similarly, the second node 100b forwards traffic arriving from network 10 to IP address IP B via network interfaces 110g and 110h to the second network 20, and traffic arriving from the second network 20 to IP address IP D via network interfaces 110h and 110g to the first network. In normal operation, node 100b ignores any traffic arriving to IP address IP A on the interface 110e and IP address IP C on interface 110f. The interfaces which are ignored in normal operation, i.e. which are inactive, are shown with dashed line in FIG. 1. Naturally, the nodes 100a and 100b can perform any filtering or blocking of traffic according to the tasks of a firewall device. Such functionality is well known to a man skilled in the art, and is not described further.

Nodes 100a and 100b have a communication link between them in order to allow monitoring and testing of each other. If node 100a observes that node 100b has stopped functioning, node 100a activates the previously inactive interfaces 110b and 110d, and starts handling traffic directed to IP addresses IP B and IP D. Conversely, if node 100b observes that node 100a has stopped functioning, node 100b activates the previously inactive interfaces 110e and 110f, and starts handling traffic directed to IP addresses IP A and IP C. For simplicity, it is advantageous to connect interfaces with the same IP and MAC addresses to the same network segment, whereby any network element in networks 10 and 20 need not know about the possible fault situation in one of the nodes and the corresponding change of flow of traffic.

For load balancing reasons, it is advantageous that half of the hosts in network 10 are configured to use IP address IP A for traffic directed to the second network 20, and the second half to use IP address IP B for traffic directed to the second network 20. The inventive structure allows the configuration to be static, whereby no specific functionality is required from the structure of the networks 10, 20 in order to benefit from the fault tolerant operation.

FIG. 1 also shows means 120 for observing the operation of another network node and for producing an indication about the operational state of said another network node. Advantageously, the means 120 is realized using software modules executed by the processor of the network node 100. The software can perform tests on the node itself and report the results to the other node, and monitor the functioning of the other node. The monitoring and testing functions can comprise for example testing the functioning of disk drives and network interface cards of the physical interfaces, and monitoring the amount of free disk space and free memory space. The repertoire of tests and monitored functions can be chosen according to the requirements of the particular application of the invention and knowledge of the fault statistics of the particular hardware and software platforms. Therefore the invention is not limited to any particular selection of monitoring and testing functions, and those functions described here are only examples of feasible functions to be monitored and tested.

Figure 2:
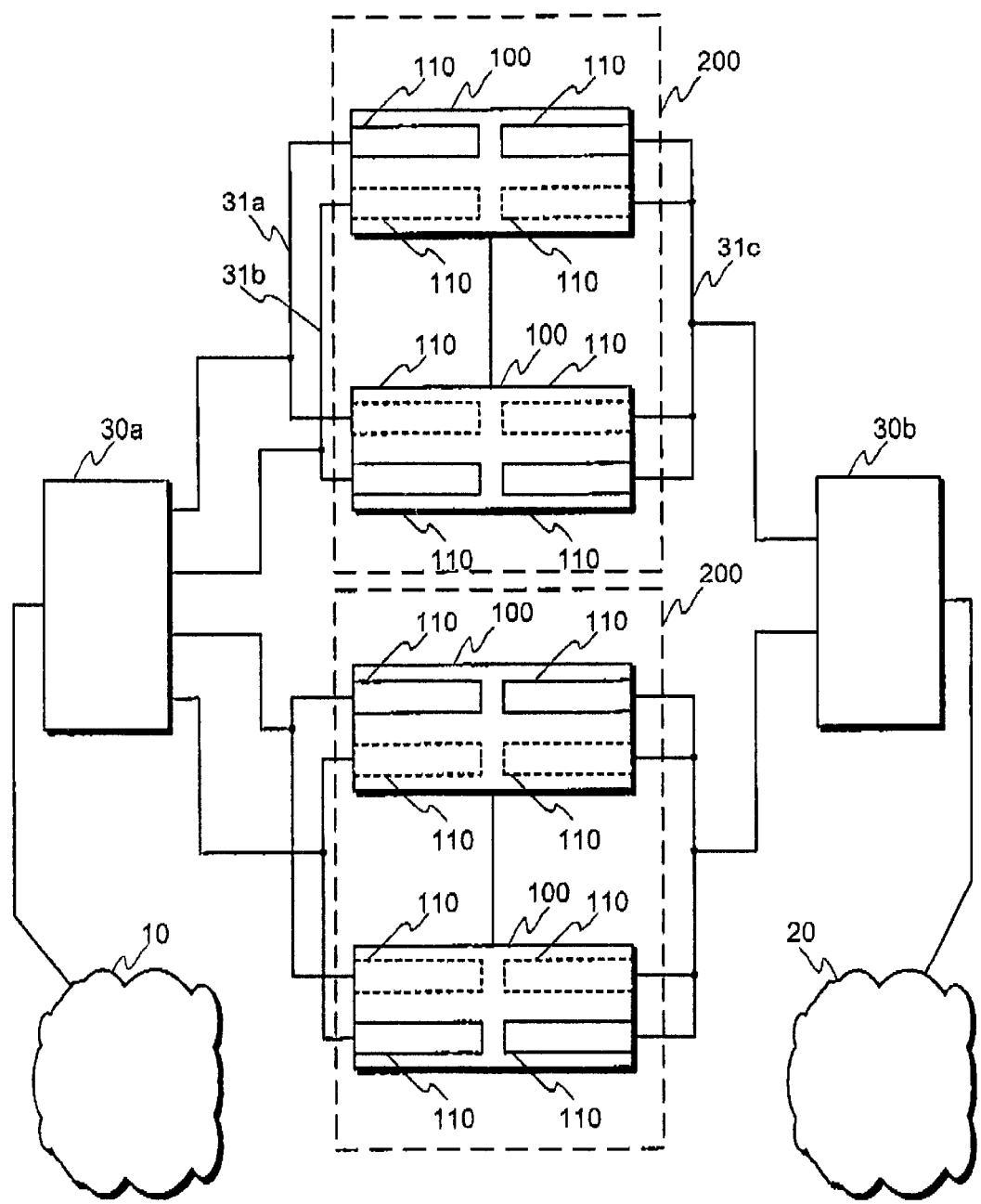

FIG. 2 shows an example of a structure according to a further advantageous embodiment of the invention. FIG. 2 shows two node units 200, each comprising two network nodes 100. The use of two units provides an increased traffic capacity. Each of the units 200 are configured as described in connection with FIG. 1. Fault tolerant operation is provided by each of the two nodes of each unit backing up the other node, as described previously. FIG. 2 shows also routers 30 connecting the units to rest of the networks 10 and 20. FIG. 2 also shows, that the two interfaces of a node connected to the same network can be connected to two different network segments 31a, 31b, or to the same network segment 31c. At the side of the first network 10, each network segment is connected to only such interfaces at the units 200, which have the same IP and MAC addresses. At the side of the second network 20, all interfaces at that side of each unit 200 are connected to the same network segment.

The inventive structure virtually eliminates outages caused by a fault in at hardware component. The probability of a fault in a single network node is considerable, when very high requirements are placed on the continuity of service and capacity of the system. The downtime caused by a hardware fault can in practice be from hours to several days without a high availability system. Such faults are generally non-reproducible e.g. they occur on a one-time basis. Hardware faults are covered very well with the inventive structure. The system is able to detect a fault and transfer the functionality of the broken node to another node transparently, unnoticed by the user. In an advantageous embodiment of the invention, the network nodes comprise means for performing tests to check the functionality of various components of the hardware and to detect the most common hardware failures, such as network interface card failures and disk failures.

Another source of faults is the software of the network node, i.e. the operating system of the network node, or for example the firewall software of the network node. Software faults are quite common reason for service disruptions and they typically show up when a new version of software is deployed, or when a new feature is used first time. In an advantageous embodiment of the invention, the network nodes comprise means for performing tests to check the functionality of software components, such as the operating system or the firewall software, and checking other factors affecting the functionality of the node such as the amount of free disk space and virtual memory.

According to a further aspect of the invention, a network node for use in a network node group for connecting a first IP network segment to a second IP network segment is provided. According to an advantageous embodiment of the invention, the network node comprises a first physical interface for connection to said first IP network segment a second physical interface for connection to said first IP network segment, a third physical interface for connection to said second IP network segment, and a fourth physical interface for connection to said second IP network segment.

According to a further advantageous embodiment of the invention, the node has a first operating state, in which the network node communicates using said first and third physical interfaces and ignores any communication received using said second and fourth physical interface, and a second operating state, in which the network node communicates using said first, second, third, and fourth physical interfaces.

According to a further advantageous embodiment of the invention, the node further comprises means for observing the operation of another network node and for producing an indication about the operational state of said another network node.

According to a further advantageous embodiment of the invention, the node is arranged change its operating state from said first operating state to said second operating state as a response to an indication about the operational state of said another network node corresponding to a fault in tile operation of said another network node.

According to a further advantageous embodiment of the invention, the node is a firewall node.

According to a still further aspect of the invention, a system for connecting a first network segment to a second network segment is provided. According to an advantageous embodiment of the invention, the system comprises a first network node having
  a first physical interface for connection to said first IP network segment
  a second physical interface for connection to said first IP network segment,
  a third physical interface for connection to said second IP network segment, and
  a fourth physical interface for connection to said second IP network segment; and
a second network node having
  a fifth physical interface for connection to said first IP network segment
  a sixth physical interface for connection to said first IP network segment,
  a seventh physical interface for connection to said second IP network segment, and
  an eighth physical interface for connection to said second IP network segment;
each of said interfaces having an IP address;
said fifth physical interface having the same IP address as the first physical interface,
said sixth physical interface having the same IP address as the second physical interface,
said seventh physical interface having the same IP address as the third physical interface, and
said eighth physical interface having the same IP address as the fourth physical interface.

According to a further advantageous embodiment of the invention, the system has
  a first operating state, in which the first network node communicates using said first and third physical interfaces and ignores any communication received using said second and fourth physical interface, and in which the second network node communicates using said six and eighth physical interfaces and ignores any communication received using said fifth and seventh physical interface;
  a second operating state, in which the first network node communicates using said first, second, third, and fourth physical interfaces; and
  a third operating state, in which the second network node communicates using said fifth, sixth, seventh, and eighth physical interfaces.

The first operating state is the normal operating state, in which neither of the nodes is at fault, The second operating state is the state, in which the second node has a fault. The third operating state is the state, in which the first node has a fault. According to a further advantageous embodiment of the invention, the system comprises means in said first network node for observing the operation of said second network node and for producing an indication about the operational state of said second network node, and means in said second network node for observing the operation of said first network node and for producing an indication about the operational state of said first network node.

According to a further advantageous embodiment of the invention, the system is arranged change its operating state from said first operating state to said second operating state as a response to an indication about the operational state of said second network node corresponding to a fault in the operation of said second network node, and arranged change its operating state from said first operating state to said third operating state as a response to an indication about the operational state of said first network node corresponding to a fault in the operation of said first network node.

According to a further advantageous embodiment of the invention, the system is a firewall system.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

What is claimed is:

1. A network node for use in a network node group for connecting a first IP network segment to a second IP segment, comprising:
  a first physical interface for connection to said first IP network segment;
  a second physical interface for connection to said first IP network segment;
  third physical interface for connection to said second IP network segment; and
  a fourth physical interface for connection to said second IP network segment;
  a first operating state, in which said network node communicates using said first and third physical interfaces and ignores any communication received using said second and fourth physical interface, and
  a second operating state, in which said network node communicates using said first, second, third and fourth physical interfaces,
  a monitoring connection to another network node;
  diagnostics unit monitoring the internal operation of said other network node over said monitoring connection and producing an indication about the operational state of said another network node;
  a network being arranged to change its operating state from said first operating state to said second operating state as a response to an indication about the operational state of said another network node corresponding to a fault in the operation of said another network node.

2. A network node according to claim 1, wherein the node is a firewall node.

3. A network element according to claim 1, wherein said diagnostics unit performs diagnostics test in the network element and reports results of said tests to said other node over said monitoring connection.

4. A network element according to claim 1, wherein said monitoring of operation of said other network node includes receiving results of diagnostics test over said monitoring connection from said other network element.

5. A network element according to claim 4, wherein said diagnostic test performed by said diagnostics unit comprises at least one of testing a functioning of disc drivers, testing functioning of network interface cards of said interfaces, monitoring amount of free disc space, and monitoring amount of free memory space.

6. A system for connecting a first network segment to a second network segment comprising:
   a first network node having:
      a first physical interface for connection to said first IP network segment;
      a second physical interface for connection to said first IP network segment;
      a third physical interface for connection to said second IP network segment, and
      a fourth physical interface for connection to said second IP network segment;
   a second network node having:
      a fifth physical interface for connection to said first IP network segment;
      a sixth interface for connection to said first IP network segment;
      a seventh physical interface for connection to said second IP network segment, and
      an eigth physical interface for connection to said second IP network segment;
   each of said interfaces having an IP address;
      said fifth physical interface having the same IP address as said first physical interface;
      said sixth physical interface having the same IP address as said second physical interface;
      said seventh physical interface having the same IP address as said third physical interface;
      said eighth physical interface having the same IP address as said fourth physical interface;
   a first operating state, in which said first network node communicates using said first and third physical interfaces and ignore any communication received using said second and fourth physical interface, and in which the second network node communicates using said sixth and eighth physical interfaces and ignores any communication received using said fifth and seventh physical interface;
   a second operating state, in which said first network node communicates using said first, second, third, and fourth physical interfaces;
   a third operating state, in which said second network node communicates using said fifth, sixth, seventh and eighth physical interfaces;
   a monitoring connection between said first and second network nodes;
   a first diagnostics unit in said first network node observing the internal operation of said second network node over said monitoring connection and producing an indication about the operational state of said second network node;
   a second diagnostics unit in said second network node observing the internal operation of said first network node over said monitoring connection and producing an indication about the operational state of said first network node;
   said first network node being configured to change its operating state from said first operating state to said second operating state as a response to an indication about the operational state of said second network node corresponding to a foault in the operation of said second network node, and
   said second network node being configured to change its operating state from said first operating state to said third operating state as a response to an indication about the operational state of said first network node corresponding to a fault in the operation of said first network node.

7. A system according to claim 6, wherein the system is a firewall system.

8. A network element according to claim 6, wherein first diagnostics unit observes the operation of said second network element by means of diagnostic tests performed in said second network element.

9. A network element according to claim 8, wherein said second diagnostics unit performs diagnostic tests in said second network element and reports results of said diagnostics tests to said first diagnostics unit in said first network node over said monitoring connection.

10. A network element according to claimed 6, wherein said second diagnostics unit observers the operation of said first network element by means of diagnostics tests performed in said first network element.

11. A network element according to claim 10, wherein said first diagnostics unit performs diagnostics tests in the first network element and reports results of said diagnostics tests to said second diagnostics unit in said second network node over said monitoring connection.

12. A network element according to any one of claims 3 to 11, wherein said diagnostic tests performed by said diagnostics unit compriese at least one of testing a functioning of disc drives, testing functioning of network interface cards of the interface.

* * * * *